(12) United States Patent
Hamamoto

(10) Patent No.: US 7,070,718 B2
(45) Date of Patent: Jul. 4, 2006

(54) METHOD FOR MANUFACTURING POLARIZER, POLARIZER, POLARIZER PLATE, AND IMAGE DISPLAY

(75) Inventor: Eiji Hamamoto, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 150 days.

(21) Appl. No.: 10/634,823

(22) Filed: Aug. 6, 2003

(65) Prior Publication Data
US 2004/0027663 A1 Feb. 12, 2004

(30) Foreign Application Priority Data
Aug. 8, 2002 (JP) .............................. 2002-230955

(51) Int. Cl.
*B29D 11/00* (2006.01)

(52) U.S. Cl. ..................... 264/1.34; 264/1.6; 264/2.7

(58) Field of Classification Search ............... 264/1.34, 264/1.1, 2.7, 2.6, 1.6; 359/405, 491
See application file for complete search history.

(56) References Cited

U.S. PATENT DOCUMENTS 6,757,102 B1 * 6/2004 Nishida et al. ............. 359/491

FOREIGN PATENT DOCUMENTS

| JP | 64-7575 | 2/1989 |
|---|---|---|
| JP | 2731813 | 12/1997 |
| JP | 2001-141926 | 5/2001 |
| JP | 2001-154020 | 6/2001 |
| JP | 2002-40255 | 2/2002 |

* cited by examiner

*Primary Examiner*—Mathieu D. Vargot
(74) *Attorney, Agent, or Firm*—Westerman, Hattori, Daniels & Adrian LLP

(57) ABSTRACT

A polarizer comprising polyvinyl alcohol based films stretched at high stretching ratios stably manufactured: a method for manufacturing including a stretching processing process, a dyeing treatment process, and a boron compounds treatment process to a polyvinyl alcohol film, wherein the stretching processing is performed at least twice so that a total stretching ratio may become 5.5 times or more, and in a second stretching processing or later, wet stretching processing having stretching ratios of 1.2 times or more is performed applying a peripheral velocity difference between a first pinch roll and a second pinch roll, and in the wet stretching processing, a film conveyed out from the first pinch roll is passed on a first guide roll so as to make a holding angle (A) of 120 through 175° on a first guide roll to which the film first contacts.

5 Claims, 1 Drawing Sheet

[FIG. 1]
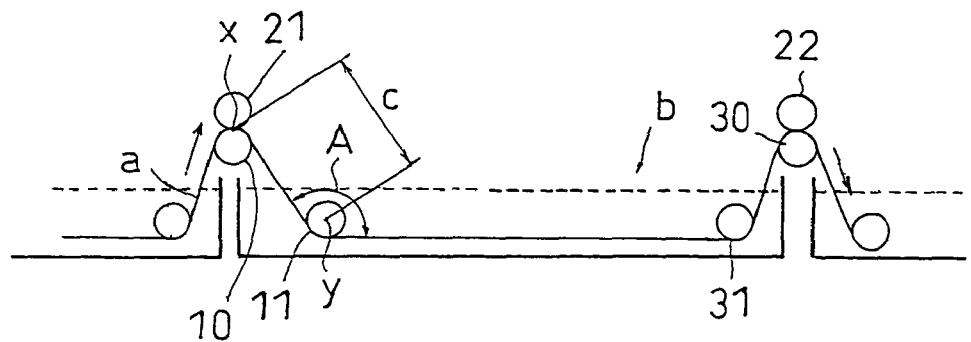
[FIG. 2]
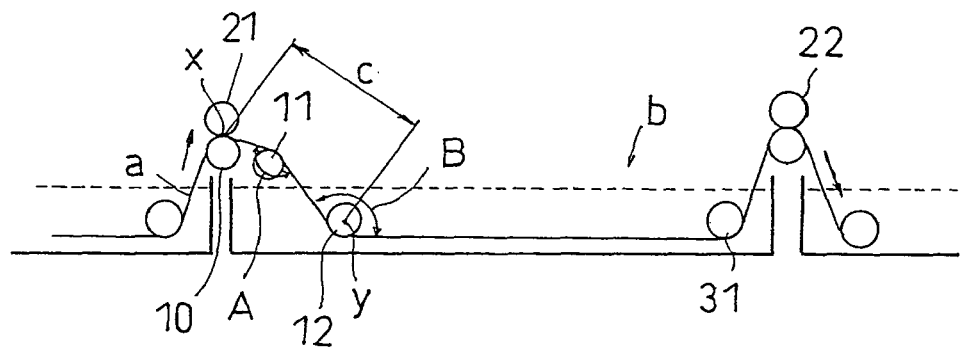
[FIG. 3]
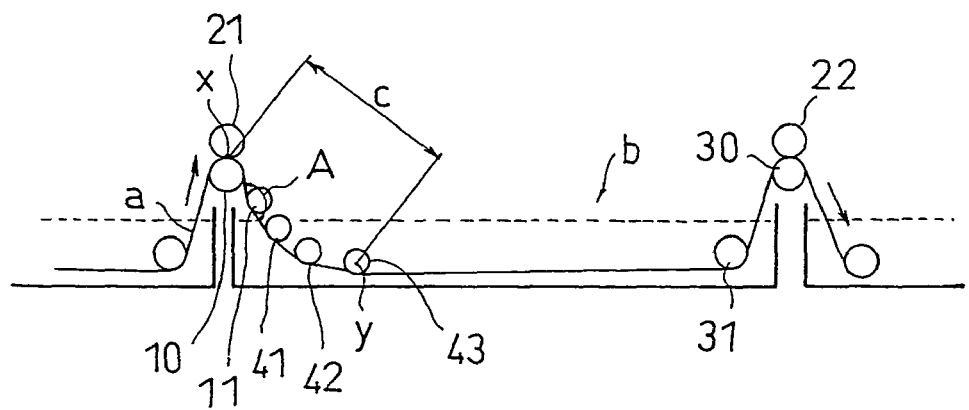

METHOD FOR MANUFACTURING POLARIZER, POLARIZER, POLARIZER PLATE, AND IMAGE DISPLAY

BACKGROUND OF THE INVENTION

1. Field of the Invention

The present invention relates to a method for manufacturing a polarizer, and to a polarizer obtained by the method. And, this invention relates to a polarizing plate using the polarizer and an optical film, and furthermore to an image display, such as a liquid crystal display, an organic electroluminescence display, a PDP, and the like, using the polarizing plate and the optical film. Furthermore, this invention relates to a wet type stretching apparatus having a treatment bath used for wet type stretching processing in the method for manufacturing a polarizer.

2. Description of the Prior Art

Liquid crystal display (LCD) are used for personal computers, TVs, monitors, cellular phones, PDAs, etc., and in such fields, colorization, reflective colorization and high definition, and high brightness are promptly realized in recent years. In order to realize these expansions of application for LCDs and improvement in display qualities, such as high definition and raise in brightness, performance upgrading of polarizing plates used for LCDs in optical characteristics (improvement in transmission factor or polarization degree) is required.

Since it has high transmission factors and high polarization degrees, polyvinyl alcohol based films treated with dyeing treatment have been conventionally used as polarizers used for liquid crystal display devices etc. Besides, the polarizers are usually used as polarizing plates with protection films attached on one side or both sides thereof. In recent years, more advanced performances are required for liquid crystal display devices, and higher transmission factors and higher polarization degrees are required also for polarizers, and as a result, various methods for manufacturing polarizers that can be adapted to such requirements are proposed.

As a method for performance upgrading of the optical characteristics of the polarizers, a method giving high ratio stretch processing of polyvinyl alcohol based films in manufacturing process of polarizers may be mentioned. Stretching at high ratio given to polyvinyl alcohol based films, however, provides high possibility of outbreak of so-called "breakage at the time of stretching", that is, fracture of films under stretching, which is not preferable in productivity. Moreover, a stretching method performed in two or more steps of a polyvinyl alcohol based films may be mentioned. However, larger stretching ratios after a second step easily give the above-mentioned "breakage at the time of stretching", and as a result polarizers having high polarization degree may not be stably obtained.

The present invention aims at providing a method that may stably manufacture a polarizer comprising polyvinyl alcohol based films stretched at high stretching ratios. This invention also aims at providing a polarizer obtained by the manufacturing method, and further aims at providing a polarizing plate and an optical film using the polarizer. Furthermore, this invention aims at providing image display using the polarizing plates and the optical films, and furthermore, this invention relates to a wet type stretching apparatus having a treatment bath used for wet type stretching processing in the method for manufacturing a polarizer.

SUMMARY OF THE INVENTION

As a result of wholehearted examinations for solving the above-mentioned subjects repeatedly carried out by the present inventors, it was found out that the above-mentioned purpose could be attained by a method for manufacturing a polarizer shown below, thus leading to completion of this invention.

The present invention relates to a method for manufacturing a polarizer comprising a stretching processing process, a dyeing treatment process, and a boron compounds treatment process to a polyvinyl alcohol film, wherein the stretching processing is performed at least twice so that a total stretching ratio may become 5.5 times or more, and in a second stretching processing or later, wet stretching processing having stretching ratios of 1.2 times or more is performed applying a peripheral velocity difference between a first pinch roll and a second pinch roll, and in the wet stretching processing, a film conveyed out from the first pinch roll is passed on a first guide roll so as to make a holding angle (A) of 120 through 175° on a first guide roll to which the film first contacts.

In this invention, a stretching processing having total stretching ratios of 5.5 times or more is performed in at least two steps. The above-mentioned method secures high stretching ratios and may provide performance upgrading of optical characteristics. The above-mentioned total stretching ratios are preferably 5.7 times or more, and more preferably 6.1 times or more. Since excessively large total stretching ratios tend to give breakage at the time of stretching, the total stretching ratios are preferably set as 7 times or less. Moreover, in second stretching or later, stretching processing having stretching ratios of 1.2 times or more is performed so that total stretching ratios may become 5.5 times or more in wet condition. Wet type stretching ratios of the second stretching or later is preferably 1.5 times or more, and more preferably 2.1 times or more. Since excessively large wet type stretching ratios of the second stretching or later tends to give breakage at the time of stretching, the wet type stretching ratios of the second stretching or later is preferably set as 3.5 times or less. In addition, the stretching ratio in a first stretching processing is 1.2 through 4.5 times, and preferably 1.7 through 3.5 times.

Moreover, in this invention, a film conveyed out from a first pinch roll in the wet type stretching processing is passed on a first guide roll so as to make a holding angle (A) of 120 through 175° on the first guide roll to which the film first contacts. When the film is passed on so as to make holding angles in the above-mentioned range (A), the film is not rapidly stretched, and thereby occurrence of breakage at the time of stretching may be prevented. The above-mentioned holding angle (A) is preferably 150 through 170°.

In the above-mentioned method for manufacturing a polarizer, the film conveyed out from the first pinch roll is preferably passed on an under side of the first guide roll. Besides, in the above-mentioned method for manufacturing a polarizer, when the film conveyed out from the first pinch roll is passed on an upper side of the first guide roll, the film is preferably further passed on an under side of a guide roll so that the film makes a holding angle (B) of 120 through 175° on the guide roll which the film passes first.

In order to control rapid stretching of the film and to prevent occurrence of breakage at the time of stretching, it is preferable that the film conveyed out from the first pinch roll makes holding angles in a range of 120 through 175° on the guide roll which the film passes first on the under side of the guide roll. Therefore, when a film conveyed out from the first pinch roll is passed on an upper side of the first guide roll, it is preferable that holding angles (B) on a guide roll which the film is passed on first an under side of a guide roll may be in a range of 120 through 175°. The above-mentioned holding angle (B) is preferably 150 through 170°.

Besides, in the above-mentioned method for manufacturing a polarizer, it is preferable that a rolls distance (C) between a point of contact (x) of the first pinch roll and a guide roll facing to the first pinch roll, and a central point (y) of a guide roll that is located at the first pinch roll side, closest to a bottom of a bath for wet stretching processing, and simultaneously closest to the first pinch roll in the bath is 1 m or more.

Since the above-mentioned rolls distance (C) is set as 1 m or more, the films are not stretched rapidly, leading to prevention of occurrence of breakage at the time of stretching. The above-mentioned rolls distance (C) is preferably 1.5 m or more. The above-mentioned rolls distance (C) usually preferable to be set in a range of 1 through 5 m. In addition, a distance until the above-mentioned film conveyed enters into the bath is set short so that films conveyed out from the first pinch roll may immediately introduced into a wet type bath liquid, and thus stretching is performed in the bath liquid to provide large prevention effect of a breakage at the time of stretching.

In the above-mentioned method for manufacturing a polarizer, the wet type stretching processing is preferably performed in a boron compounds bath. A boron compounds treatment simultaneously performed with the wet type stretching processing provides large prevention effect of the breakage at the time of stretching.

Moreover, in order to prevent breakage at the time of stretching during film stretching, stretching performed in a decreased concentration of cross-linking treatment bath (boron compounds treatment bath), stretching performed at a temperature set 50° C. or more, stretching performed at a stretching rate set low etc. may demonstrate effect, and as in the above-mentioned present invention the above-mentioned arrangement of guide rolls in the wet type stretching processing bath may demonstrate larger prevention effect of breakage at the time of stretching.

And the present invention relates to a polarizer obtained by the above described method And the present invention relates to a polarizing plate with a transparent protective layer formed at least on one side of the polarizer.

And the present invention relates to an optical film with at least one above described polarizer or one above described polarizing plate laminated thereon.

Furthermore, the present invention relates to an image display using at least one above described polarizing plate or one above described optical film.

And the present invention relates to a wet stretching apparatus comprising a treatment bath used for wet stretching processing in a method for manufacturing a polarizer, the treatment bath having on both sides thereof a first pinch roll and a second pinch roll, the first pinch roll and the second pinch roll having guide roll facing to the pinch roll, respectively, wherein the first guide roll is arranged so that a film conveyed out from the first pinch roll makes a holding angle (A) of 120 through 175° on the first guide roll to which the film contacts first.

The above-mentioned wet type stretching apparatus is preferably installed so that the film conveyed out from the first pinch roll may be passed on an under side of the first guide roll.

In the above-mentioned wet type stretching apparatus, when the film conveyed out from the first pinch roll is passed on an upper side of the first guide roll, a guide roll is preferably arranged so that the film being passed on an under side of a first guide roll further makes a holding angle (B) of 120 through 1750 on the guide roll which the film is passed first.

In the above-mentioned wet type stretching apparatus, it is preferable that a rolls distance (C) between a point of contact (x) of the first pinch roll, and the guide roll facing to the first pinch roll, and a central point (y) of a guide roll located at the first pinch roll side, closest to a bottom of the bath for wet type stretching processing, and simultaneously closest to the first pinch roll in the bath is 1 m or more.

These wet type stretching apparatus are used for wet type stretching in a method for manufacturing a polarizer of this invention.

BRIEF DESCRIPTION OF THE DRAWINGS

FIG. 1 is a layout of guide rolls of a bath used for the wet type stretching processing of second time or later in the method for manufacturing a polarizer of this invention.

FIG. 2 is another layout of guide rolls of a bath used for the wet type stretching processing of second time or later in the method for manufacturing a polarizer of this invention.

FIG. 3 is another layout of guide rolls of a bath used for the wet type stretching processing of second time or later in the method for manufacturing a polarizer of this invention.

DETAILED DESCRIPTION OF THE INVENTION

Polyvinyl alcohols or derivatives thereof are used for a material of a non-stretched film in a process of producing a polarizer of the present invention. As derivatives of polyvinyl alcohol, in addition to polyvinyl formals, polyvinyl acetals, etc. may be mentioned, and derivatives modified with olefins, such as ethylene and propylene; unsaturated carboxylic acids, such as acrylic acid, methacrylic acid, and crotonic acid; alkyl esters of the above described unsaturated carboxylic acids and acrylamide etc. may be mentioned. Generally, polyvinyl alcohol with approximately 1000 to 10000 of degree of polymerization and approximately 80 to 100 mol % of degree of saponification is used.

In addition, additives, such as plasticizers, may also be contained in the above described polyvinyl alcohol film. As plasticizers, polyols and condensates thereof, etc., for example, glycerin, diglycerin, triglycerin, ethylene glycol, propylene glycol, polyethylene glycols, etc. may be mentioned. Although an amount of the plasticizers used is not especially limited, it is preferable to be set no more than 20% by weight in the non-stretched film. Usually, the film having a thickness of about 30 through 150 µm is used.

To the above-mentioned polyvinyl alcohol based film, stretching process, dyeing treatment process, and boron compounds treatment process are given.

As for stretching process, uniaxial stretching treatments are given at least twice. Stretching processing of second time or later is performed using below-mentioned wet type stretching processing. A uniaxial stretching processing method by dry type stretching is not especially limited, and any following methods may be adopted, for example: methods given in JP patent No. 1524033, JP patent No. 2731813, etc.; stretching methods performed while applying tensile force between rolls installed inside or outside drying oven; stretching methods performed using heating rolls; and stretching methods performed using tenter stretching machines etc. In the above-mentioned dry type stretching means, non-stretched films are usually kept in a heated state at about 70 through 150° C.

In the dyeing treatment process, iodine or dichromatic dyes is adsorbed to the above-mentioned non-stretched film or the above-mentioned stretched film, and orientation is given. The dyeing treatment may also be performed during the stretching processing. Swelling process may be provided before the dyeing treatment. In this invention, it is preferable that the dyeing treatment process is given to the stretched film that has been given a first stretching processing. In general, immersing the above-mentioned film in a dyeing solution usually performs the dyeing treatment. As a dyeing solution, an iodine solution is commonly used. In an iodine aqueous solution used as an iodine solution, including iodine and solubility auxiliary agent, for example, potassium iodide etc. as an iodine ion, is used. An iodine concentration is about 0.01 through 0.5% by weight, and preferably 0.02 through 0.4% by weight. A potassium iodide concentration is about 0.01 through 10% by weight, and preferably 0.02 through 8% by weight. In the dyeing treatment by iodine, a temperature of the iodine solution is usually about 20 through 50° C., and preferably 25 through 40° C. An immersion period is usually about 10 through 300 seconds, and preferably 20 through 240 seconds.

Boron compounds treatment process is performed in boron compounds. Order of treatment in boron compounds treatment process is not especially limited. The boron compounds treatment process can be performed simultaneously with a stretching process. The boron compounds treatment process can be performed two or more times. In this invention, after a first stretching processing and a dyeing treatment are performed, the boron compounds treatment process is preferably performed before a second wet type stretching processing. Furthermore, the boron compounds treatment process is preferably performed simultaneously with the second wet type stretching processing. As boron compounds, boric acid, borax, etc. may be mentioned. The boron compounds are used in a form of aqueous solution or a water-organic solvent mixed solution. A boric acid concentration of the boric acid aqueous solution etc., is about 2 through 20% by weight, and preferably 3 through 15% by weight. The boric acid aqueous solution etc. may include potassium iodide. In general, immersing the above-mentioned stretched film in a boric acid aqueous solution etc performs the above-mentioned boron compounds treatment. In addition to the above-mentioned treatment, the boron compounds treatment may be performed using a coating method, a spraying method, etc. A treatment temperature by boron compounds treatment is usually 30° C. or more, and preferably in a range of 50 through 85° C. Processing period of time with boron compounds is usually about 10 through 800 seconds, and preferably about 30 through 500 seconds.

Description about the second wet type stretching processing or later of this invention will be provided referring to drawings. It is preferable that a dyeing treatment process and a boron compounds treatment have been performed before the wet type stretching processing. As shown in FIGS. 1 through 3, after the above-mentioned treatment is performed, the wet type stretching processing is performed to a film(a) conveyed using a peripheral velocity difference between the first pinch roll 21 and the second pinch roll 22. A guide roll 10 is provided facing to the first pinch roll 21, and a guide roll 30 facing to the second pinch roll 22, respectively. A guide roll 31 is provided before a guide roll 30. Moreover, a treatment bath (b) in which the wet type stretching processing is performed includes boron compounds, and there the boron compounds processing is preferably performed simultaneously.

The film(a) conveyed out from the first pinch roll 21 is passed so that a holding angle (A) of 120 through 175° may be made on a surface of the first guide roll 11 to which the film a contacts first. In addition, a holding angle (A) represents an angle which the film(a) conveyed out by the first guide roll 11 forms via the first guide roll 11 before and after passing the first guide roll 11, as shown in the Figures.

In FIGS. 1 and 3, the film(a) is passed on an under side of the first guide roll 11. As shown in FIG. 3, guide rolls 41, 42, and 43 may be provided following the first guide roll 11. In FIG. 2, the film(a) is passed on an upper side of the first guide roll 11. When the film(a) is passed on the upper side of the first guide roll 11, the film(a) is passed on an under side of the guide roll 12 which the film(a) is passed first. The guide roll 12 is a guide roll of which the film(a) conveyed out from the first pinch roll 21 is passed first on the under side, which is preferably located so that a holding angle (B) of 120 through 175° may be formed.

Moreover, as shown in FIGS. 1 through 3, it is preferable that the rolls are arranged so that a rolls distance (C) between a point of contact (x) of the first pinch roll 21 and the guide roll 10, and a central point (y) of the guide roll may be 1 m or more. A guide roll providing a base of the central point (y) is a guide roll located in a side of the first pinch roll 21 in a bath(b). That is, it is a guide roll located in a left side when the bath(b) is divided into right and left sides. Moreover, a guide roll providing the base of the central point (y) is a guide roll closest to a bottom of the bath(b), and closest to the first pinch roll 21. That is, when several guide rolls are provided in the bottom of the bath, a guide roll closest to the first pinch roll 21 is a guide roll providing the base of a central point (y). Therefore, a guide roll providing a base of the central point (y) in FIG. 1 is the first guide roll 11. A guide roll providing the base of a central point (y) in FIG. 2 is the guide roll 12. A guide roll providing the base of a central point (y) in FIG. 3 is a guide roll 43.

The polyvinyl alcohol film (stretched film) subjected to the respective treatments is subjected to water-washing treatment and drying treatment in a usual manner, thereby producing a polarizer. In addition, impregnating processing by iodine ion using potassium iodide solutions etc. may arbitrarily be given in a method for manufacturing a polarizer of this invention.

The above-described polarizer may be used as a polarizing plate with a transparent protective layer prepared at least on one side thereof using a usual method. The transparent protective layer may be prepared as an application layer by polymers, or a laminated layer of films. Proper transparent materials may be used as a transparent polymer or a film material that forms the transparent protective layer, and the material having outstanding transparency, mechanical strength, heat stability and outstanding moisture interception property, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

In general, a thickness of a transparent protection film is 500 μm or less, preferably 1 through 300 μm, and especially preferably 5 through 200 μm.

As a transparent protection film, if polarization property and durability are taken into consideration, cellulose based polymer, such as triacetyl cellulose, is preferable, and especially triacetyl cellulose film is suitable. In addition, when transparent protection films are provided on both sides of the polarizer, transparent protection films comprising same polymer material may be used on both of a front side and a back side, and transparent protection films comprising different polymer materials etc. may be used.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

Moreover, it is preferable that the transparent protection film may have as little coloring as possible. Accordingly, a protection film having a phase difference value in a film thickness direction represented by Rth=[(nx+ny)/2−nz]×d of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a phase difference value (Rth) of −90 nm through +75 nm in a thickness direction. The phase difference value (Rth) in a thickness direction is preferably −80 nm through +60 nm, and especially preferably −70 nm through +45 nm.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Adhesives are used for adhesion processing of the above described polarizing film and the transparent protective film. As adhesives, isocyanate derived adhesives, polyvinyl alcohol derived adhesives, gelatin derived adhesives, vinyl polymers derived latex type, aqueous polyesters derived adhesives, etc. may be mentioned. The above-described adhesives are usually used as adhesives comprising aqueous solution, and usually contain solid of 0.5 to 60% by weight.

A polarizing plate of the present invention is manufactured by adhering the above described transparent protective film and the polarizing film using the above described adhesives. The application of adhesives may be performed to any of the transparent protective film or the polarizing film, and may be performed to both of them. After adhered, drying process is given and the adhesion layer comprising applied dry layer is formed. Adhering process of the polarizing film and the transparent protective film may be performed using a roll laminator etc. Although a thickness of the adhesion layer is not especially limited, it is usually approximately 0.1 to 5 μm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported(PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

The present invention will be specifically described by way of Examples and Comparative Examples. In these examples, the "%" represents "% by weight".

Example 1

Washing and swelling treatment were performed in a 35° C. water bath to a polyvinyl alcohol film (average degree of polymerization 2400, the 99.9% of degree of saponification: Vinylon film produced by Kuraray Co., Ltd.) with a thickness of 75 μm. The film was immersed for 60 seconds at 30° C. in an iodine aqueous solution having 0.3% of potassium iodide concentration, and 0.05% of iodine concentration, and it was uniaxially stretched by 3.7 times, while being dyed. Furthermore, cross-linking treatment (no stretching) was carried out for the film in 34° C. boric acid aqueous solution having 8% of boric acid concentration.

Subsequently, the above-mentioned stretched film (film (a) in FIG. 1) was conveyed into a bath(b) in which guide rolls shown in FIG. 1 were arranged, and a second stretching was performed by 1.7 times of stretching ratio applying a wet type stretching processing so that a total stretching ratio might provide 6.3 times. In the bath(b), a boric acid aqueous solution having 7% of boric acid concentration at 60° C. was used, and, cross-linking treatment was performed simultaneously with stretching. Each of guide rolls was arranged so that a holding angle (A) might give 160° and a rolls distance (C) might give 2 m in FIG. 1. Then, a water washing treatment for 10 seconds was given with 25° C. pure water, and an obtained film was dried for 4 minutes at 60° C. to provide a polarizer.

The above-mentioned manufacturing of a polarizer was performed continuously for 5 hours, and a number of occurrence of fracture (breakage at the time of stretching) of the film occurred in the second stretching processing was observed. Table 1 shows results.

Examples 2 through 5 and Comparative examples 1 through 4

Same methods as in Example 1 were repeated, except that layouts applied to the second stretching processing performed in the bath(b), holding angles (A), holding angles (B), and distances between rolls (C) were changed as shown in Table 1 to manufacture polarizers. Table 1 shows numbers of breakage at the time of stretching.

TABLE 1

|  | Layout | Holding angle (A) | Holding angle (B) | Rolls distance (C) | Numbers of breakage at the time of stretching |
|---|---|---|---|---|---|
| Example 1 | FIG. 1 | 160° | — | 2.0 m | 0 time |
| Example 2 | FIG. 2 | 160° | 125° | 1.8 m | 0 time |
| Example 3 | FIG. 1 | 160° | — | 0.8 m | 1 time |
| Example 4 | FIG. 2 | 150° | 150° | 0.9 m | 1 time |
| Example 5 | FIG. 2 | 140° | 145° | 1.8 m | 0 time |
| Comparative example 1 | FIG. 1 | 115° | — | 0.8 m | 4 times |
| Comparative example 2 | FIG. 1 | 100° | — | 0.7 m | 3 times |
| Comparative example 3 | FIG. 2 | 100° | 100° | 0.9 m | 3 times |
| Comparative example 4 | FIG. 2 | 95° | 90° | 0.8 m | 5 times |

The invention claimed is:

1. A method for manufacturing a polarizer comprising a stretching processing process, a dyeing treatment process, and a boron compounds treatment process to a polyvinyl alcohol film,
    wherein the stretching processing is performed at least twice so that a total stretching ratio is 5.5 times or more, and in a second stretching processing or later, wet stretching processing having stretching ratios of 1.2 times or more is performed by applying a peripheral velocity difference between a first pinch roll and a second pinch roll,
    and in the wet stretching processing, a film conveyed out from the first pinch roll is passed on a first guide roll so as to make a holding angle (A) of 120 through 175° on a first guide roll to which the film first contacts.

2. The method for manufacturing a polarizer according to claim 1, wherein the film conveyed out from the first pinch roll is passed on an under side of the first guide roll.

3. The method for manufacturing a polarizer according to claim 1, wherein the film conveyed out from the first pinch roll is passed on an upper side of the first guide roll,
    the film being passed on the first guide roll is further passed on an under side of another guide roll so that the film makes a holding angle (B) of 120 through 175° on the other guide roll which is the subsequent guide roll the film passes first after being passed on the first guide roll.

4. The method for manufacturing a polarizer according to claim 1, wherein a roll distance (C) between a point of contact (x) of the first pinch roll and the guide roll facing to the first pinch roll, and a central point (y) of a guide roll located at the first pinch roll side, closest to a bottom of a bath for wet stretching processing, and simultaneously closest to the first pinch roll in the bath is 1 m or more.

5. The method for manufacturing a polarizer according to claim 1, wherein the wet stretching processing is performed in a boron compounds bath.

* * * * *